United States Patent
Ward et al.

(10) Patent No.: US 12,313,522 B2
(45) Date of Patent: May 27, 2025

(54) SYSTEMS AND METHODS FOR IMPROVED IMAGING AND FLUORESCENCE IN FLOW CYTOMETRY AND OTHER APPLICATIONS

(71) Applicant: Life Technologies Corporation, Carlsbad, CA (US)

(72) Inventors: Michael D Ward, Eugene, OR (US); Gregory Kaduchak, Chandler, AZ (US); Dmitriy Strelkov, Eugene, OR (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days.

(21) Appl. No.: 18/240,441

(22) Filed: Aug. 31, 2023

(65) Prior Publication Data

US 2024/0094110 A1    Mar. 21, 2024

Related U.S. Application Data

(63) Continuation of application No. 17/548,964, filed on Dec. 13, 2021, now Pat. No. 11,788,949.
(Continued)

(51) Int. Cl.
*G01N 15/14* (2024.01)
*G01N 15/1434* (2024.01)
*G01N 15/01* (2024.01)

(52) U.S. Cl.
CPC ......... *G01N 15/1436* (2013.01); *G01N 15/01* (2024.01); *G01N 2015/1438* (2013.01); *G01N 2015/1443* (2013.01)

(58) Field of Classification Search
CPC ............... G01N 15/1436; G01N 15/01; G01N 2015/1438; G01N 2015/1443;
(Continued)

(56) References Cited

U.S. PATENT DOCUMENTS 4,790,653 A    12/1988 North, Jr.
5,272,354 A    12/1993 Kosaka
(Continued)

OTHER PUBLICATIONS

International Patent Application No. PCT/US2021/063156; Int'l Search Report and the Written Opinion; dated Apr. 4, 2022; 14 pages.

*Primary Examiner* — Roy M Punnoose

(57) ABSTRACT

Provided are systems and methods that allow for brightfield imaging in a flow cytometer, allowing for collection of fluorescence and high-quality image date. The disclosed technology also gives rise to an illumination pattern that allows a user to create different oblique or structured illumination profiles within a static system. With the disclosed approach, a user can illuminate a sample from a first direction (e.g., with laser illumination configured to give rise to one or more of fluorescence information and scattering information), collect scattering information from a second direction, collect fluorescence information from a third direction, and capture an image of the sample from a fourth direction. (Two or more of the foregoing can be accomplished simultaneously.) Also as described elsewhere herein, an illumination used to illuminate the sample for visual image capture can be communicated to the same through a lens that also collects fluorescence from the sample.

20 Claims, 10 Drawing Sheets

Related U.S. Application Data

(60) Provisional application No. 63/183,126, filed on May 3, 2021, provisional application No. 63/125,290, filed on Dec. 14, 2020.

(58) Field of Classification Search
CPC ......... G01N 15/1433; G01N 2015/144; G01N 15/1427; G01N 2015/1472; G01N 15/147
See application file for complete search history.

(56) References Cited

U.S. PATENT DOCUMENTS

| | | | |
|---|---|---|---|
| 8,289,522 B2* | 10/2012 | Tearney | G02B 23/2476 |
| | | | 356/479 |
| 2007/0195310 A1* | 8/2007 | Kanda | G01N 15/1433 |
| | | | 356/73 |
| 2010/0238442 A1* | 9/2010 | Heng | G01N 15/1433 |
| | | | 382/294 |
| 2014/0154793 A1 | 6/2014 | Naito et al. | |
| 2017/0343475 A1* | 11/2017 | Yamada | G01N 21/6428 |
| 2018/0284009 A1* | 10/2018 | Kaduchak | B01L 3/502761 |
| 2022/0107271 A1* | 4/2022 | Hara | G01N 15/147 |
| 2022/0276250 A1* | 9/2022 | Yasuda | G01N 1/36 |

* cited by examiner

SYSTEMS AND METHODS FOR IMPROVED IMAGING AND FLUORESCENCE IN FLOW CYTOMETRY AND OTHER APPLICATIONS

RELATED APPLICATIONS

The present application is a continuation of U.S. patent application Ser. No. 17/548,964, "Systems And Methods For Improved Imaging And Fluorescence In Flow Cytometry And Other Applications" (filed Dec. 13, 2021, now allowed); which claims priority to and the benefit of U.S. patent application No. 63/125,290, "Systems And Methods For Improved Imaging And Fluorescence In Flow Cytometry And Other Applications" (filed Dec. 14, 2020) and U.S. patent application No. 63/183,126, "Systems And Methods For Improved Imaging And Fluorescence In Flow Cytometry And Other Applications" (filed May 3, 2021). The entireties of all foregoing applications are incorporated herein by reference for any and all purposes.

TECHNICAL FIELD

The present disclosure relates to the field of laboratory illumination systems.

BACKGROUND

Flow cytometers analyze cells at traveling at relatively high velocities. In typical such instruments, particles are transported through one or more focused laser beams, where resultant fluorescent and scattered light are collected by banks of detectors. Data from multiple fluorescent colors can be detected from each individual laser line, typically at rates of up to 10,000's of cells per second. Current market trends are offering more and more colors at lower prices, democratizing the ability to ask more complicated biological questions with great statistical power.

Flow cytometry data is often usually used to determine cell size and granularity as well as the quantity of phenotypic and/or functional fluorescent label bound to or expressed by a single cell. Exemplary FIG. 1 provides data from a flow cytometry experiment seeking to find stem cells in peripheral blood. Clinically relevant CD34+ cells are shown in the circular gate. The x-axis displays the side scatter signal and the y-axis represents the cell's expression of CD34 as identified by the binding to the cell surface of the fluorescent anti-CD34 antibody. Each dot in the plot corresponds to the analysis of a single cell. The data associated with each 'dot' in FIG. 1, however, has no corresponding spatial information. Because of this, the cytometrist must rely on analyzing a cluster of similar cells that reliably confirm the presence of the cell type of interest.

Exemplary FIG. 2 displays data from an imaging cytometer. These images give confirmation that a given cell under investigation is what is expected. This imaging date is invaluable in understanding whether 'dots' truly represent a cell of interest as opposed to the wrong cell morphology, debris, or two cells in the laser simultaneously. Existing imaging cytometers, however, suffer from known deficiencies, as their approach to collecting imaging data of cells results in uncertainty in the data, which uncertainty can lead to loss of synchronization between the flow cytometry data associated with a given particle and the imaging data associated with that particle. Accordingly, there is a long-felt need for improved imaging cytometer systems and methods.

SUMMARY

In meeting the described long-felt needs, the present disclosure provides imaging systems, comprising: a sample region configured to receive a sample; a laser illumination train configured to provide a laser illumination to the sample region so to effect fluorescence of a sample in the sample region; an optical illumination train configured to provide imaging illumination to illuminate a sample in the sample region for imaging; a fluorescence train configured to receive illumination directed from the sample region; a sample region lens in optical communication with the sample region, the sample region lens being configured to direct an illumination collected from the sample region to the fluorescence train, the sample region lens being configured to direct an illumination from the optical illumination train to the sample region; optionally, a forward scatter detector configured to collect scattered light from the sample region; and an image capture train configured to collect an image of a sample in the sample region illuminated by the imaging illumination.

Also provided are methods, comprising: with a sample communicated within a sample region; exciting the sample with excitation illumination from a plurality of lasers operating at different wavelengths so as to generate a fluorescence profile of the sample; illuminating the sample with imaging illumination from an optical illumination train configured to provide imaging illumination to illuminate the sample for imaging; with a sample region lens, (1) directing, to a fluorescence train, illumination emitted from the sample in response to the excitation illumination, and (2) directing, to the sample region, imaging illumination from the illumination train; and collecting, with an image capture train, an image of the sample when the fluorescence profile of the sample meets one or more predetermined fluorescence criteria.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIG. 9 illustrates images of particles at locations A, B, and C in FIG. 8. The 'donut' shaped disk is the illumination field as viewed through the camera. As time delay is changed the particle can be placed in different regions of illumination. Images of Jurkat cells are shown from each location. Position A demonstrates shadowing features associated with oblique illumination. As the cell's position changes through B and C, one can see a progression of image contrast and structure.

DETAILED DESCRIPTION OF ILLUSTRATIVE EMBODIMENTS

Figure 1:
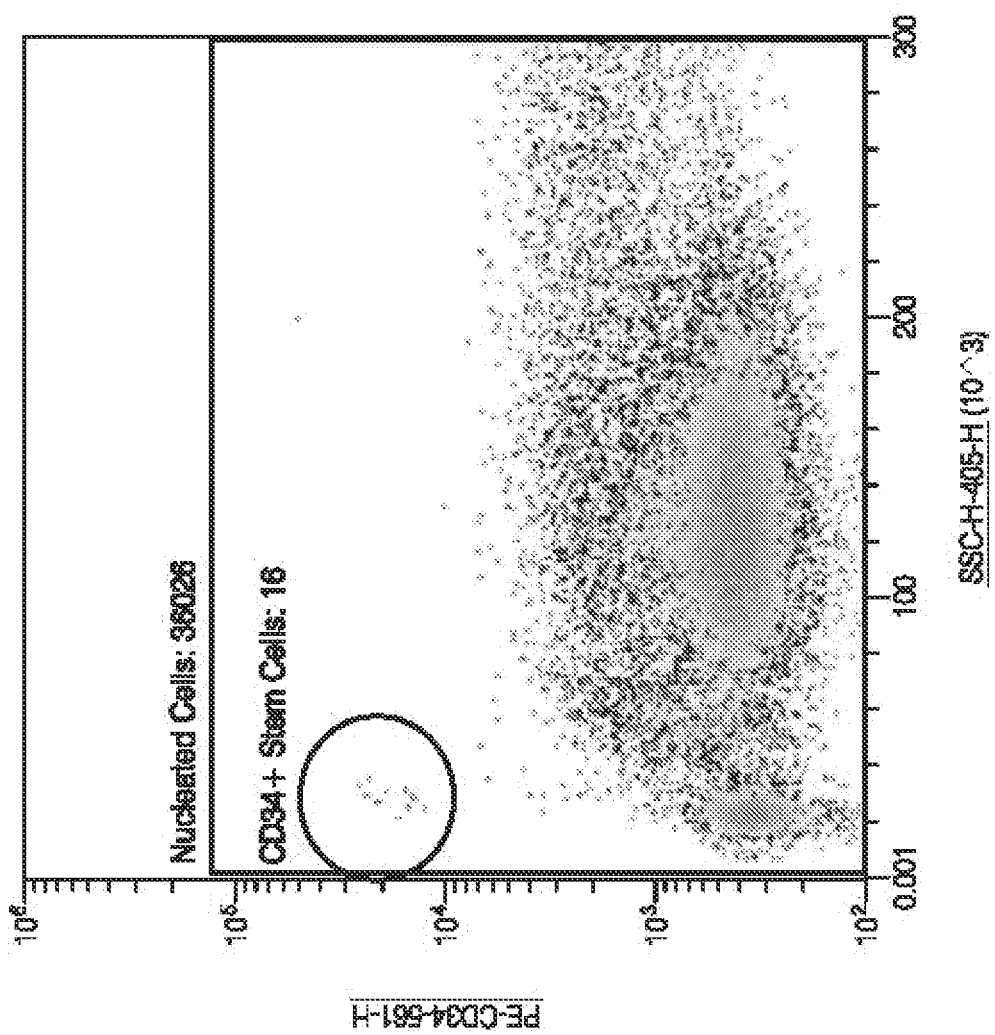
FIG. 1 provides conventional flow cytometry data gathered from peripheral blood. CD34+ stem cells are shown within the circular gate. These cells are rare and are only represented by a few dots contained within a sample size of >36,000 cells.
Figure 2:
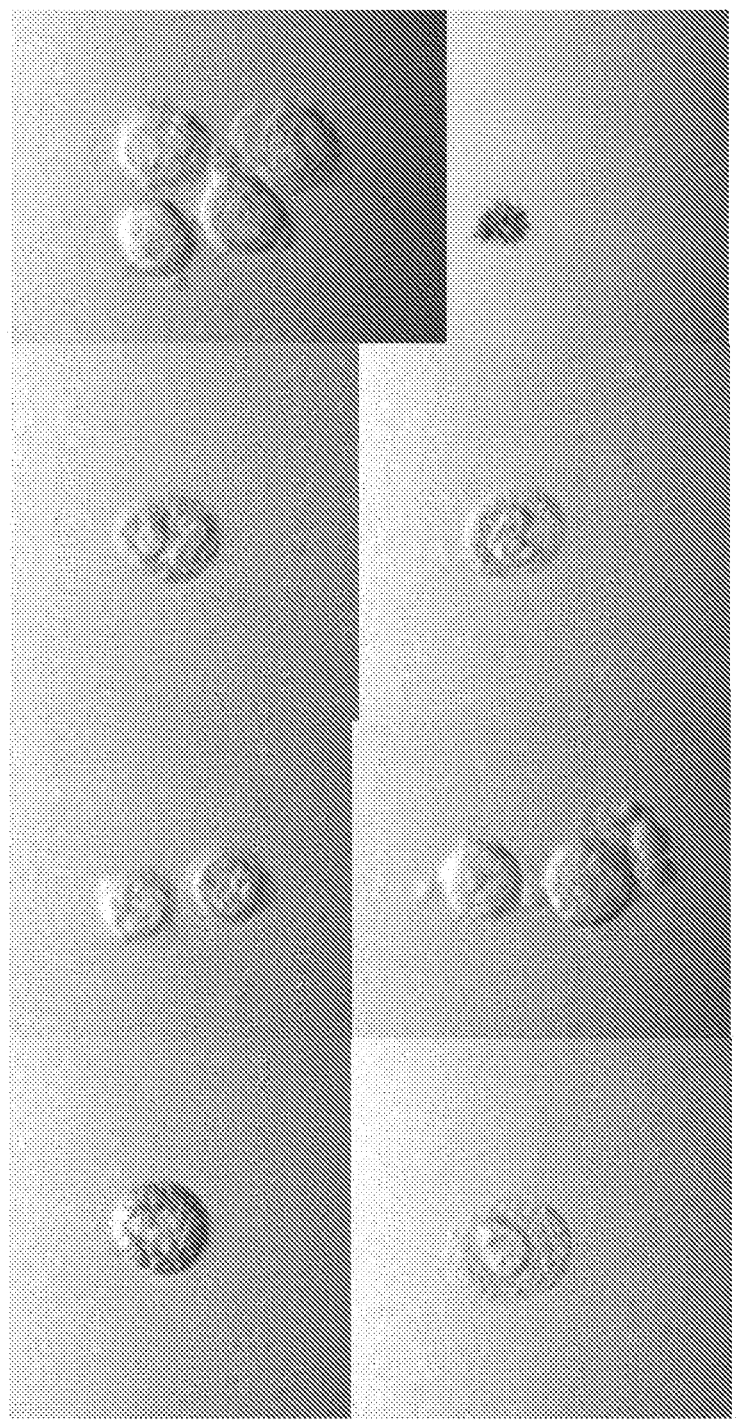
FIG. 2 provides images collected of particles flowing through a flow cytometer from a single sample using the configuration described within the present invention.

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

Figure 3:
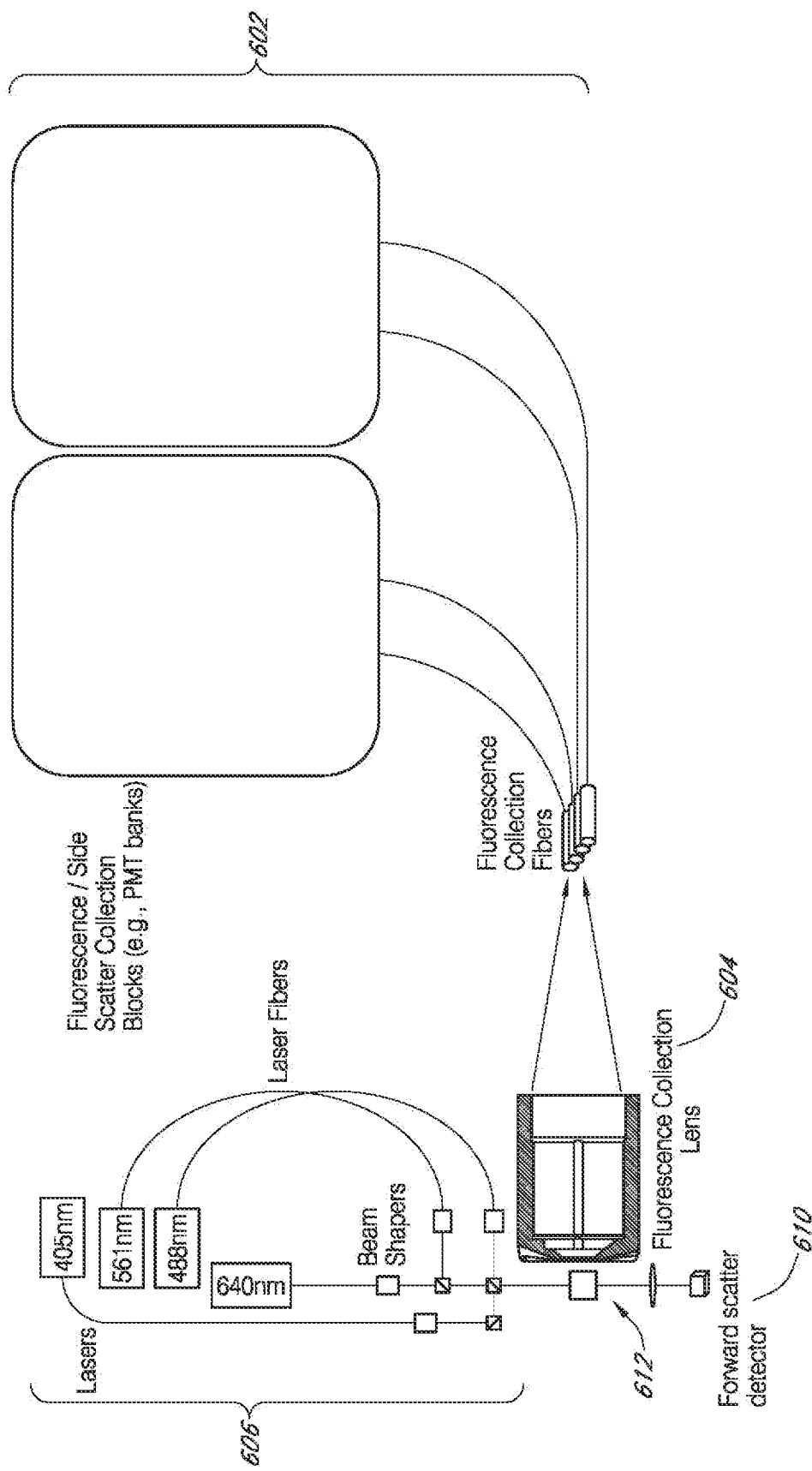
FIG. 3 provides an exemplary layout of a flow cytometer. Lasers illuminate particles in a flow cell. Forward scatter is collected in a detector along the optical axis of the lasers. Scatter and fluorescent light are communicated through a collection lens to pinholes (e.g., fibers, apertures) that are separated by the laser spacing (out of page), with one pinhole per laser. The light from each laser is spatially isolated to the pinhole in the collection plane. The spatially separated light collectors can be fibers for fiber coupled collection or apertures if air propagation to detector banks is used. (Particle flow is out of the page.)

A typical layout of a flow cytometer is shown in FIG. 3. In such an instrument, there is a flow cell 612 in which particles travel at speeds of meters per second. As seen in the image, three sides of the flow cell are occupied by components used to collect the conventional flow cytometry data. One entrance/side of the flow cell is occupied by a laser excitation train 606. Such a train can include multiple lasers, laser fibers, and beam shapers; an exemplary such arrangement is shown in FIG. 3. Lasers can be of wavelengths suitable for the user's purposes, e.g., lasers of 405 nm, 561 nm, or 488 nm. In line with the excitation and on the opposite wall of the flow cell is a forward scatter detector 610. Orthogonal to both the laser light axis and the axis associated with the particle direction of travel is a lens 604 (typically a relatively high numeric aperture) that collects fluorescent and side scattered light. As shown in FIG. 3, an instrument can include a train 602 that collects fluorescence/side scatter; the train can include PMT banks or other suitable modules. As shown, fluorescence collection fibers can be used to direct fluorescence from lens 604 to train 602.

The collection lens focuses the light emanating from a particle onto fiber optics or it is sent through an aperture to spatially separate the signals associated with each laser. The light entering the spatially separated spots is then sent to a bank of detectors. From an optics standpoint, the lasers can be placed closely together in order to fit in the field of view of the collection lens. This spacing is typically on the orders of tens or hundreds of microns, e.g., from about 10 microns to about 1000 microns.

Figure 4:
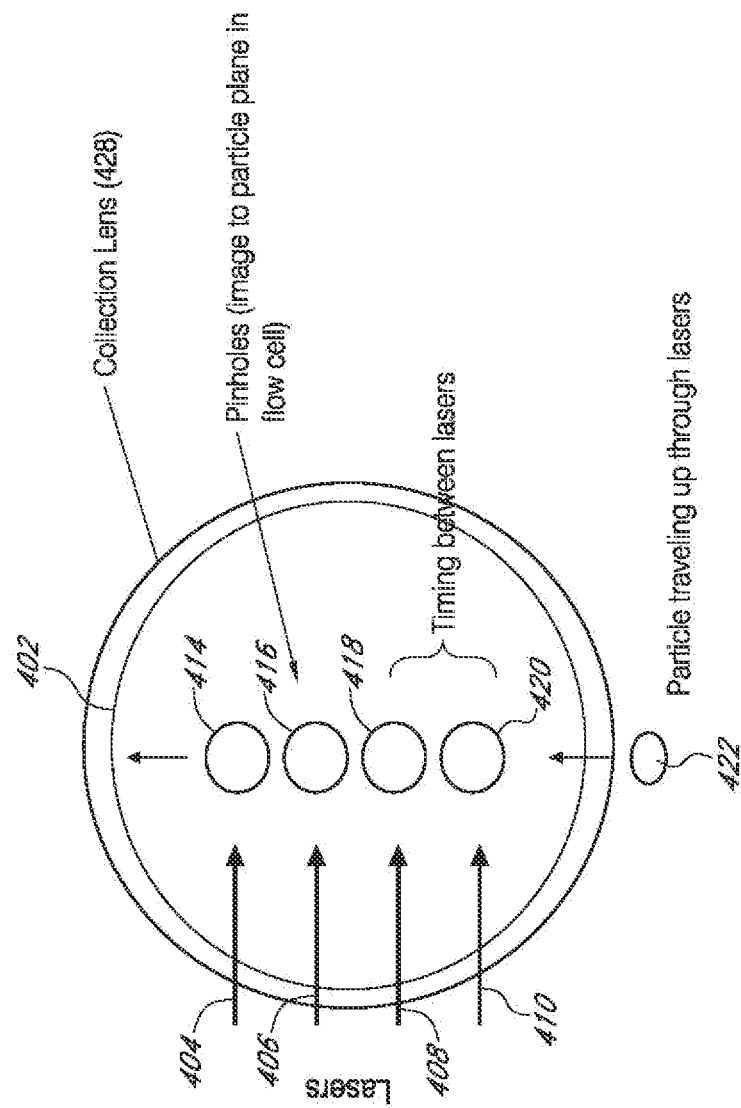
FIG. 4 illustrates that lasers can be positioned vertically along the direction of travel of the particles. Data from the particle traversing each laser is synchronized by the timing. Due to velocity variations felt by each particle, the distance between each laser is held to a minimum. The distances are suitably be close enough to minimize the timing errors but far enough such that there is not bleed from the adjacent laser into the fiber/aperture.

In order to synchronize the collected light at the detector bank to a specific particle as it passes through a laser, the travel time is calibrated such that the data collected at specific times can be associated with a specific particle, as shown in non-limiting FIG. 4.

As shown in that figure, lasers 404, 406, 408, and 410 are directed to a target field 402 that is addressed by a collection lens 428. As described elsewhere herein, pinholes 414, 416, 418, and 420 allow imaging at the particle plane within the flow cell. As the particle 422 travels within the field 402 the particle is illuminated by successive lasers in the particle's pathway and reflected light or fluorescence that results from this illumination is collected from each successive pinhole. (Each pinhole can correspond to a different laser.) As shown, the time it takes the particle to travel between successive lasers/pinholes is relatively short, as shown by the "timing between lasers" bracket.

To reduce timing errors between laser positions, one can center the particles within the flow channel to ensure all particles travel with the same velocity. (Methods for centering particles will be known to those of ordinary skill in the art.) But because of the locational uncertainty of the particle's placement near the central axis of the chamber, timing errors can occur. These errors are amplified as the distance between lasers increases and thus close laser spacing is advantageous. In a typical cytometer with a laser spacing of 200 microns, increasing the separation to just 2 millimeters can increase timing errors by 10×.

Figure 5:
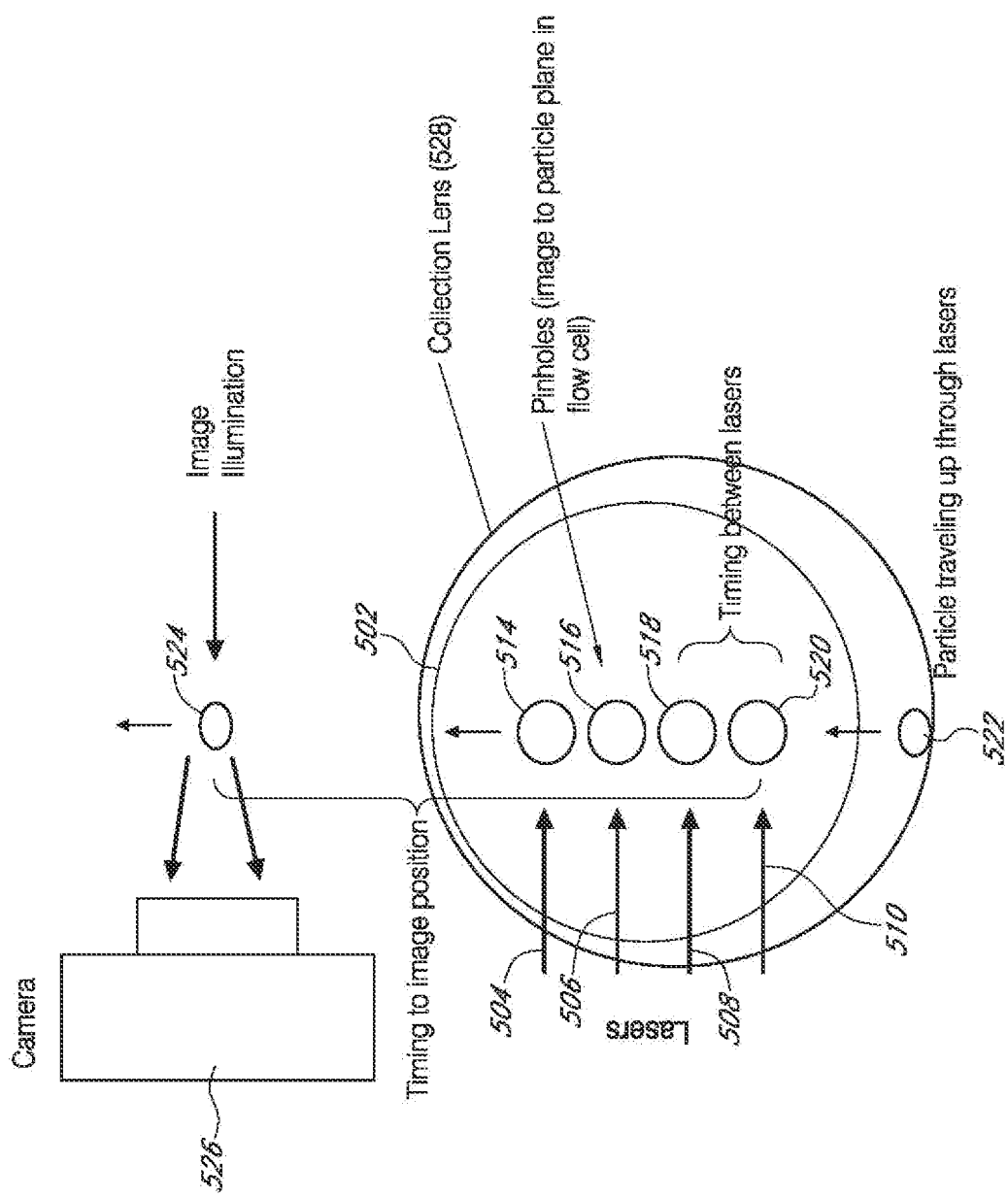
FIG. 5 illustrates lasers positioned vertically along the direction of travel of the particles in a typical imaging configuration, wherein the camera is displaced from the conventional flow cytometry collection. The condition is forced upon the configuration as the conventional flow cytometry data collection uses three sides of the flow cell. Synchronization of the image particle to the conventional data is accomplished through timing from the lasers to the camera position. Due to mechanical interference of the conventional data collection system and image collection system, the distance between them can be large creating larger timing uncertainties.

As described previously, it can be advantageous to collect images of the cells that correspond with the conventional flow cytometry data. FIG. 5 shows a standard configuration for imaging in a flow cytometer. As shown in that figure, lasers 504, 506, 508, and 510 are directed to a target field 502 that is addressed by a collection lens 528. Pinholes 514, 516, 518, and 520 allow imaging at the particle plane within the flow cell. As the particle 522 travels within the field 502 the particle is illuminated by successive lasers in the particle's pathway and reflected light or fluorescence that results from this illumination is collected from each successive pinhole. (Each pinhole can correspond to a different laser.)

As shown, the time it takes the particle to travel between successive lasers/pinholes is relatively short, as shown by the "Timing between lasers" bracket. After the particle traverses field 502, the particle is illuminated by an image illumination source and the particle is imaged by camera 526 when the particle arrives at imaging position 524.

Conventional flow cytometry data is taken in the plane of the lasers and detectors while the particle is imaged further downstream in a different collection plane. The distances between the two planes scales with the size of the flow cytometry/imaging components as mechanical interference of the components requires a minimum separation.

The distance from the lasers to the downstream collection of the image is problematic; as shown, the particle transit time lasers (from the particle's perspective) is significantly shorter than the transit time to imaging position 524. Placing the imaging components further downstream adds additional uncertainty to the arrival time of the particle at the camera and thus synchronization between the particle's conventional flow cytometry data and its image can be compromised. Further, for standard flow and imaging components, the necessary distance can become relatively large (e.g., on the order of centimeters) relative to the distance between lasers, thus increasing system size and/or complexity.

For this reason, it is advantageous to collect the image data much closer to the conventional flow cytometry collection plane. Such a configuration, however, is not available in existing methods, as three of the flow cell's walls are already populated, leaving only one to conduct imaging.

Given there is access to only one side, it would be possible to use an epi-fluorescent microscope arrangement where both the imaging and excitation are done from the same side, such that only a single wall is required. This approach, however, will not work to collect bright field images where the light source is required to be on the opposite wall of the flow cell and thus requires two sides of the flow cell to conduct imaging.

So as not to interfere with the conventional components and create an additional face on the flow cell, one can use the configuration in FIG. 5, described above. But given his configuration's shortcomings in timing and synchronization, it is necessary to develop a configuration where the image is collected in comparatively close proximity to the conventional flow cytometry plane.

To remedy these shortcomings, the disclosed technology provides, inter alia, a method to configure components to achieve brightfield imaging in a flow cytometer. In addition, the disclosed configuration provides an illumination pattern that allows a user to create different oblique/structured illumination profiles within a static system.

To solve both the problem of access to the flow cell and allowing for imaging to occur close to the conventional data collection plane, the collection lens can function as both a collector of the flow cytometry data and a light condenser for the image illumination source.

As described herein (e.g., FIG. 6), a user can collect scattering information from the sample. Also as described elsewhere herein, a user can illuminate a sample from a first direction (e.g., with laser illumination configured to give rise to one or more of fluorescence information and scattering information), collect scattering information from a second direction, collect fluorescence information from a third direction, and capture an image of the sample from a fourth direction. (Two or more of the foregoing can be accomplished simultaneously.) Also as described elsewhere herein, an illumination used to illuminate the sample for visual image capture can be communicated to the sample through a lens that also collects fluorescence from the sample.

Figure 7:
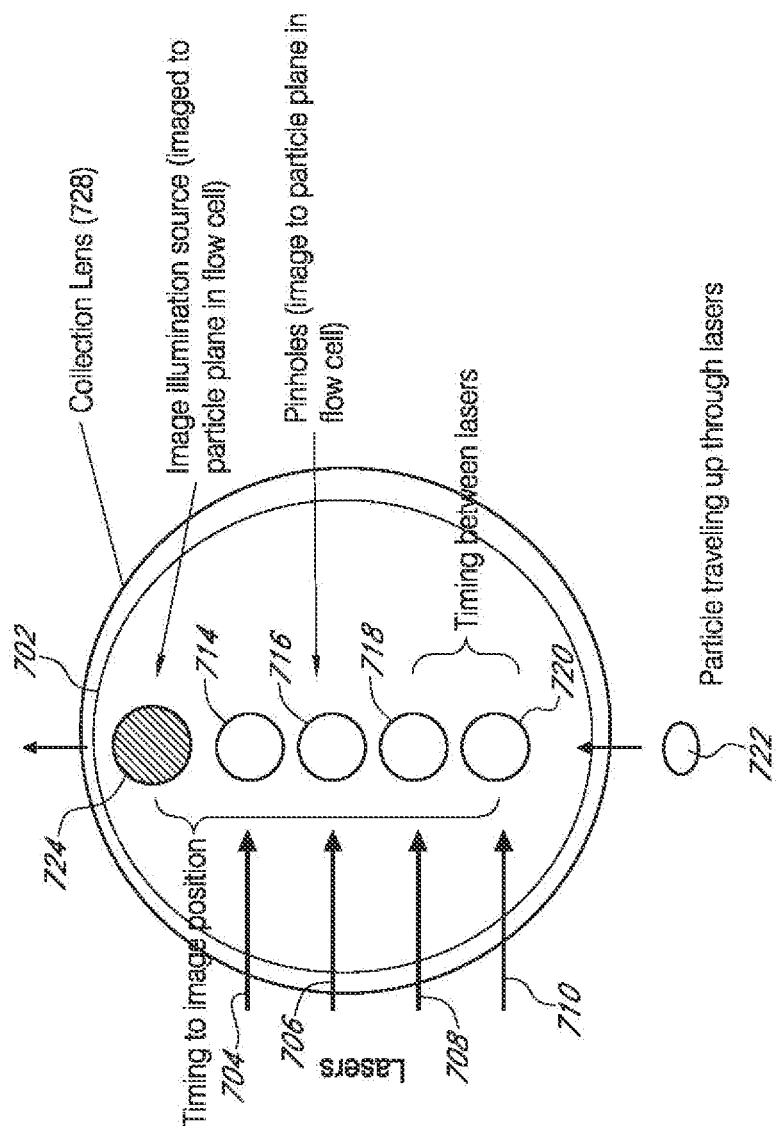
FIG. 7 illustrates an illumination source placed near the collection plane behind the collection lens. It can be viewed as an additional fiber/aperture through the collection lens. In this configuration timing can be greatly reduced by allowing the image source to be located near the fiber/aperture location.

FIG. 7 provides an exemplary (non-limiting) system in which an additional pinhole is added. As shown, the excitation source can be focused to the position of the particle through the pinhole. In such a configuration, the camera can be placed on the remaining face, opposite the collection lens. This configuration allows for the imaging components to be in or very near to the conventional flow cytometry data collection plane (or region), thereby decreasing timing uncertainties.

This approach can be described with specific reference to FIG. 7. As shown in that figure, fluorescence and imaging is performed within field 702. As shown, as particle 722 travels within field 702, the particle is illuminated by successive lasers (710, 708, 706, and 704), with each laser being associated with a pinhole (720, 718, 716, and 714, successively). Particle 722 is then illuminated by an image illumination source when the particle reaches image position 724, which image position is comparatively close to the lasers past which the particle proceeded. As shown, the amount of time it takes for the particle to arrive at the imaging position in the configuration of FIG. 7 is relatively small compared to the comparable time needed to reach the imaging position in FIG. 5.

Fluorescence pinholes can be separated by, e.g., from about 50 μm to about 400 μm in the image plane. Fibers (which can be considered a type of pinholes) themselves can be separated from the image plane by the lens, so they physically are separated by a distance related to the magnification of the lens. For example, if one has a 50 μm separation in the image plane and if the lens is a 10× lens, then the fiber physical fiber separation is 0.5 mm. It should be understood, however, that the separation (both distance and time) can be zero, as the disclosed technology is well suited to make fluorescence collection and image illumination at the same location at the particle.

A given imaging pinhole can be separated from a nearest fluorescence pinhole by zero μm, but can also be separated by up to about 5000 μm, e.g., from about 1 μm I to about 5000 μm, from about 10 μm to about 4500 μm, from about 25 μm to about 4000 μm, from about 50 μm to about 3500 μm, from about 75 μm to about 3000 μm, from about 100 μm to about 2500 μm, from about 200 μm to about 2000 μm, from about 250 μm to about 1500 μm. The sample can transit between the first fluorescence location and the first imaging location in from about 0 μs (i.e., when the first fluorescence location and the first imaging location are the same), or from about 0 μs to about 5 ms, e.g., from 1 μs or 5 μs to about 800 μs, from about 5 μs to about 500 μs, or even from about 10 μs to about 250 μs. The velocity of a particle can be, e.g., from about 0.3 m/s to about 15 m/s, from about 0.5 m/s to about 10 m/s, or even from about 0.7 m/s to about 5 m/s. 0.5 m/s particle speed is considered especially suitable.

Figure 6:
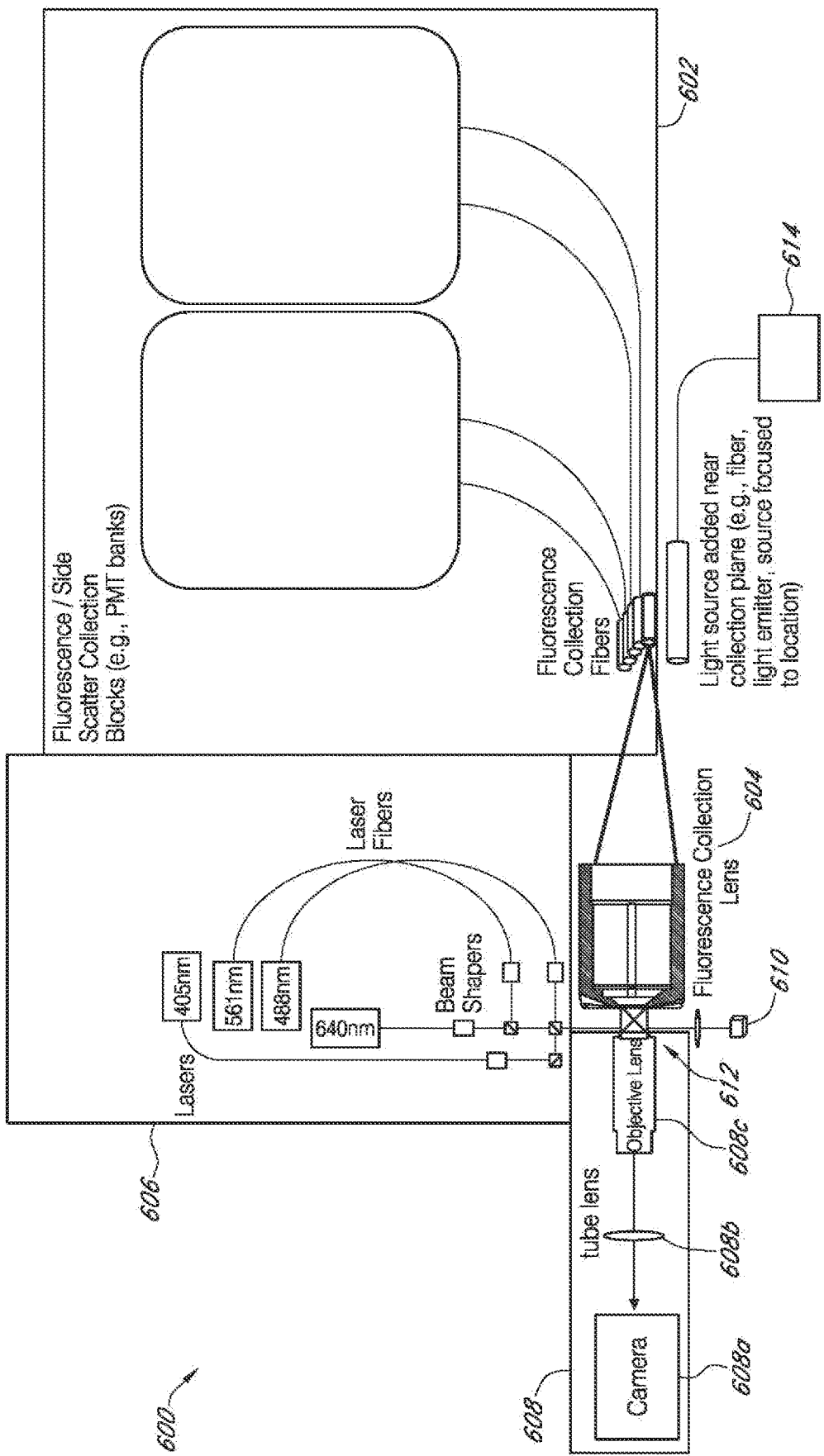
FIG. 6 illustrates an illumination placed near the collection plane behind the collection lens. It can be viewed as an additional fiber/aperture. The collection lens acts as a condenser for the light source and focuses illumination light at the location of the particle in the flow cell. It should be noted that to attain different illumination profiles, the source does not need to be in the exact 'conjugate' plane as the fibers/apertures. (Particle flow is out of the page.)

FIG. 6 provides an overview of an exemplary system 600 according to the present disclosure. As shown, the system can include flow cell 612, which flow cell can be configured to receive one or more particles, e.g., particles in a cytometer. A laser illumination train 606 can direct laser illumination to the flow cell 612, and forward scatter detector 610 can collect scattering information related to illumination of a target within the flow cell.

An illumination source 614 can be configured to provide illumination to the flow cell, e.g., illumination used for image capture of a target within the flow cell. Image capture can be performed by image capture train 608, which train can include, e.g., an objective lens (608c), a camera (608a), and one or more other lenses or mirrors (608b) to direct the image to the camera. Also shown in FIG. 6 is fluorescence train 602, which is configured to collect fluorescence evolved in the flow cell; fluorescence train 602 can include, e.g., PMT banks and fluorescence collection fibers.

As shown in FIG. 6, collection lens 604 can act as a condenser for illumination source 614 and also act to collect fluorescence evolved within flow cell 612. In this way, the collection lens 604 performs multiple tasks, thereby enabling the described collection of fluorescence information and image information in a compact region. Although not shown in detail in FIG. 6, system 600 can include the illumination/collection arrangement shown in FIG. 7 or any other arrangements provided herein.

In addition, by illuminating back through the collection lens, an interesting, spatially varying illumination profile can be created. As the collection lens focuses the light at or near the particle, the particle experiences light originating from many incident angles. The higher the numeric aperture of the light, the greater the incidence angles can become.

With the high number of incidence angles converging at the focal region, it is possible for the particle to experience quite different illumination characteristics by placing the particle in different positions relative to the focus. For instance, as the angular spectrum of the light at the focus is axisymmetric, the incidence angles from all direction are the same. Once the particle moves laterally from the optical axis, however, the angular spectrum changes, thereby creating different oblique modes of illumination. Placement of a particle within these different zones is accomplished by changing the time delay of the particle arrival. In contrast to a microscope where different illumination zones can be created by moving the position of the slide, in this embodiment the configuration remains static, thereby allowing the user to change zones through electronically changing the arrival time, and therefore the position at which a flowing particle is imaged.

Figure 8:
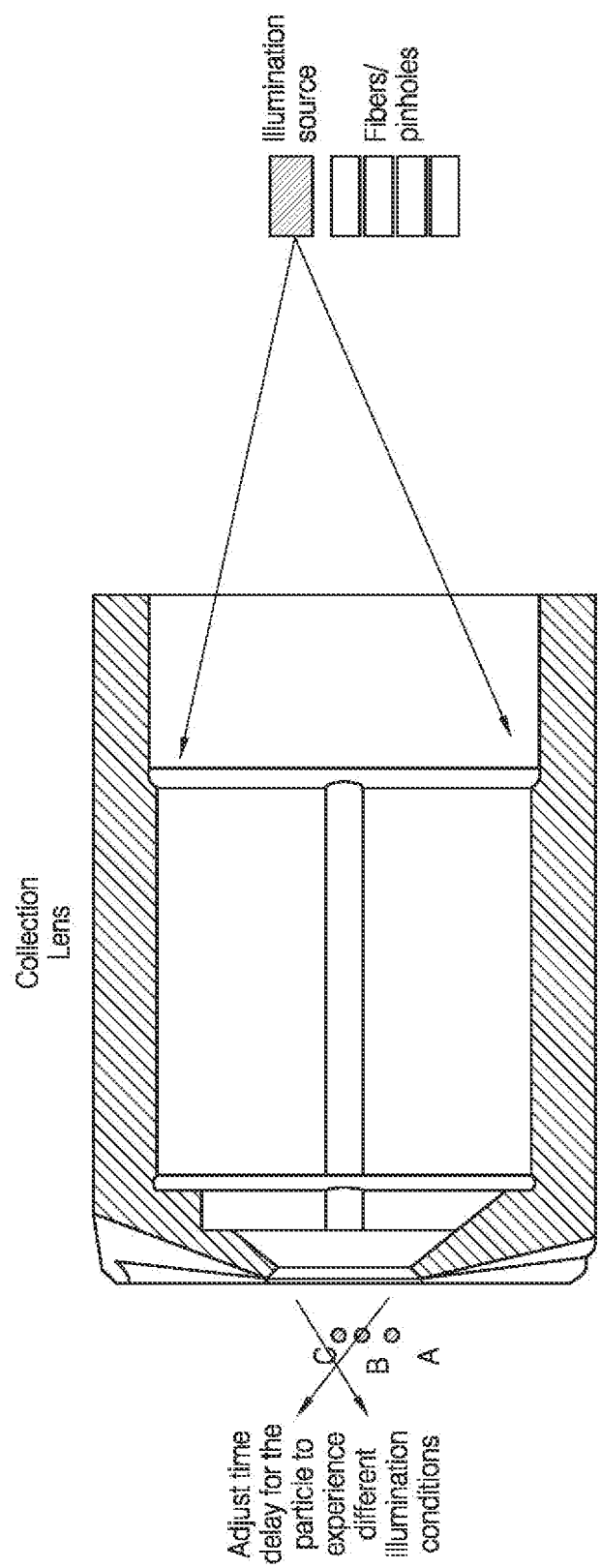
FIG. 8 illustrates that in the plane of the particle the illumination can vary greatly as a function of position within the illumination field. Different types of illumination including variations of oblique illumination can be obtained due to changes in angular spectrum as a function of position. Locations A, B, and C correspond to different illumination zones that are obtainable with different time delays.
Figure 9:
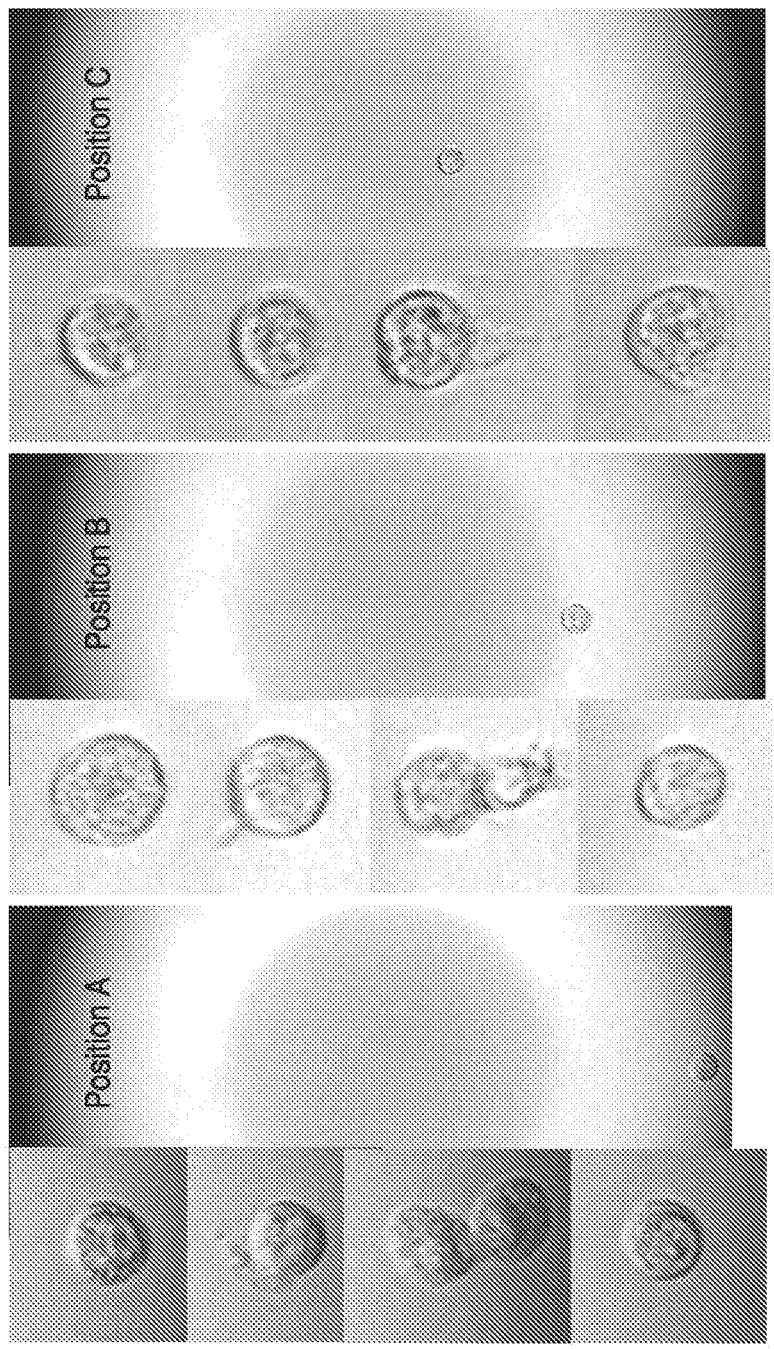
FIG. 9 displays images collected in such zones.

FIG. 8 displays a diagram showing time delay can be used to place a particle in different illumination zones (A, B, and C) of the collection lens. Corresponding images are shown in FIG. 9 where the characteristics of the generated image differ and are thus tunable to a desired view by a user.

Figure 10:
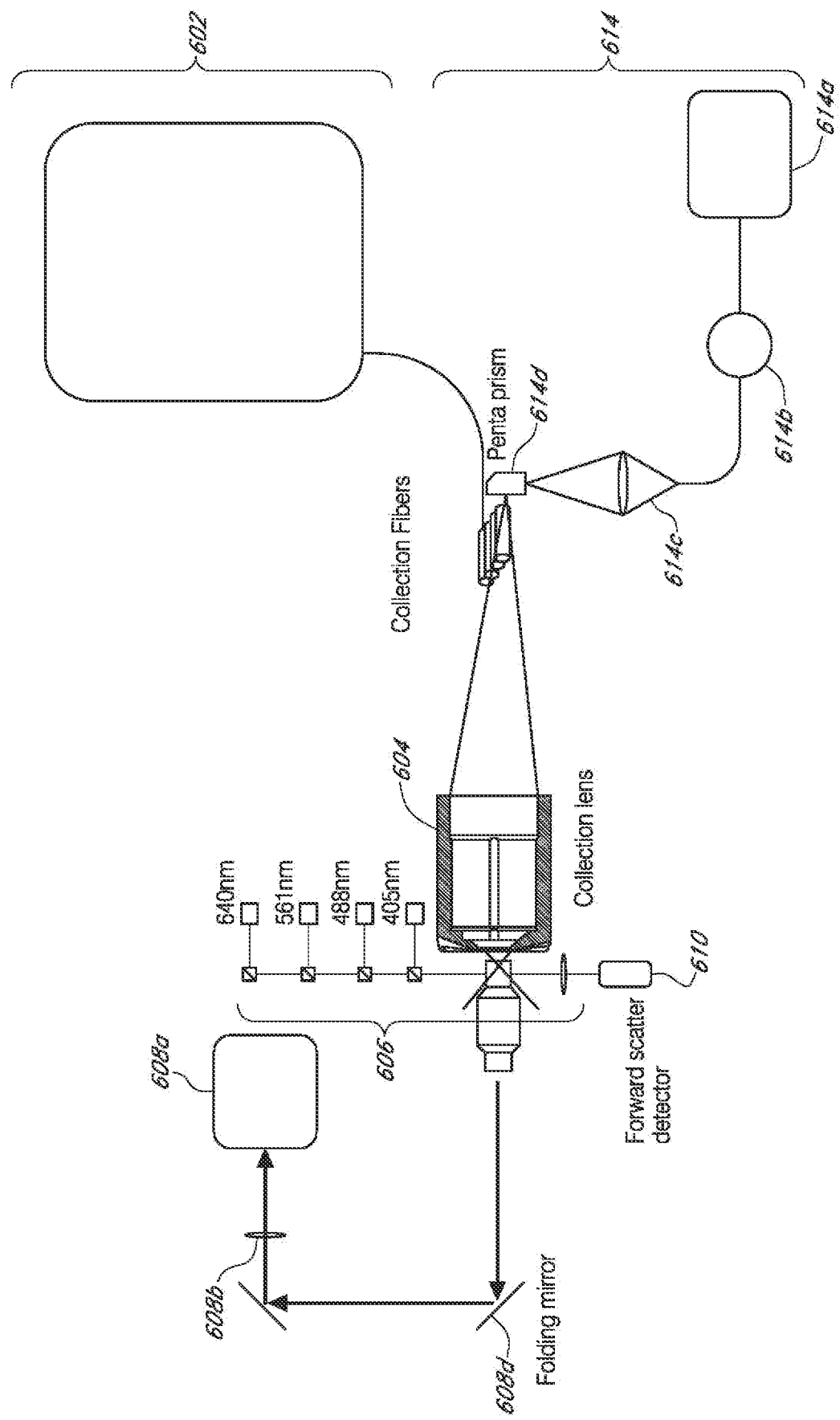
FIG. 10 provides a view of an embodiment of the disclosed technology.

FIG. 10 provides a depiction of a system according to the present disclosure. As shown, a system can include an illumination train 606, which illumination train can provide laser illumination to a flow cell, which flow cell is not labeled in FIG. 10. As shown, illumination train 606 can include one or more lasers, fibers, and beam shapers, as may be useful to the user. Collection lens 604 can collect fluorescence from the flow cell; collection lens 604 can also act to condense illumination provided by illumination source 614a (which can be, e.g., a laser). Illumination from illumination source 604 a can be directed through fiber 614b, which fiber can be a coiled fiber. A collimation lens 614c can be used to collimate illumination supplied by illumination source 614a, and the illumination can be communicated through a prism 614d, which prism can be a penta prism. Collection fibers can be in optical communication with fluorescence collection train 602 and/or with prism 614d.

Also as shown, a forward scatter detector 610 can collect forward scattering signals from the flow cell. A mirror (e.g., a folding mirror) 608*d* can direct illumination received from the flow cell to a lens 608*b*, which lens can be a tube lens. The tube lens can direct illumination to camera 608*a*. Thus, the disclosed systems can allow for collection of imaging, forward scattering, and fluorescence data from a single sample, which data can be collected simultaneously.

Aspects

The following Aspects are illustrative only and do not limit the scope of the present disclosure or the appended claims.

Aspect 1. A system for capturing an image of a target, comprising:
- a backlighting train configured to focus an illumination beam on a target area disposed within a flow cell, the backlighting train comprising:
- a laser that generates pulses of light,
- a lens (e.g., a lens) disposed on a first side of the target area, the lens being configured to act as a condenser lens,
- the lens being configured to direct illumination collected from the target area to a fluorescence train, and
- the lens being configured to direct (e.g., condense) the pulses of light onto the target area, and
- an optic fiber configured to receive a beam of the pulses of light from the laser and direct the beam unto the lens, the lens being configured to direct the pulses of light towards the target area; and an image capture train on a second side of the target area, the image capture train being configured to capture an image of a particle in the target area.

Aspect 2. The system of Aspect 1, wherein the beam is movable to expose the particle in the target area to illumination from a plurality of angles.

Aspect 3. The system of any one of Aspects 1 to 2, wherein a portion of the optic fiber is bent. The optic fiber can be, e.g., wound about a spindle, or otherwise bent or undulating.

Aspect 4. The system of Aspect 1, wherein the backlighting train further comprises a prism that scatters the beam towards the target area.

Aspect 5. The system of Aspect 4, further comprising a fluorescence train (or block), the fluorescence block being configured to collect fluorescence communicated through the first lens.

The fluorescence block can include, e.g., one or more PMTs, one or more optic fibers, and other components known to those of ordinary skill in the art. A fluorescence block can be configured to collect fluorescence at one, two, or more wavelengths.

Aspect 6. The system of any one of Aspects 1 to 5, wherein the image capture train comprises an image capture device configured to capture an image of the target area, and optionally a second lens that is focused on the target area and directs light from the target area to the focal plane. The image capture train can also include one or more mirrors.

Aspect 7. The system of Aspect 6, wherein the image capture train further comprises a folding mirror positioned between the second lens and the focal plane that directs (e.g., bends) light from the lens onto the focal plane.

Aspect 8. The system of Aspect 6, wherein the image capture device is a camera.

Aspect 9. The system of any one of Aspects 1 to 8, wherein the first lens is a lens having a numerical aperture of from about 0.2 to about 1.4, e.g., from about 0.2 to 1.2, or even from about 0.4 to 1.2, e.g., in some condenser or collection lenses.

Aspect 10. A cytometer, comprising:
- a flow cell defining a target area within,
- the flow cell being configured to communicate a sample through the target area, a light source configured to direct, from a first direction relative to the target area, light on a sample in the target area;
- a scatter detector configured to collect, from a second direction relative to the target area, scattered light from the target area;
- a fluorescence train configured to collect fluorescence from the target area;
- a collection lens oriented at a third direction relative to the target area for directing fluorescence from the target area to the fluorescence collection train;
- a backlighting system configured to provide an illumination beam to the target area, the backlighting system comprising:
- a laser that generates pulses of light,
- an optic fiber that receives the pulses of light from the laser and directs the pulses of light unto the collection lens such that the collection lens focuses the pulses of light onto the target area; and an image capture system configured to collect, from a fourth direction relative to the target area, an image of a particle in the target area.

An example arrangement is shown in FIG. 6. As shown in that figure, laser illumination train 606 directs (laser) light onto flow cell 612 from a first direction, with scatter detector 610 arranged at a second direction relative to the flow cell. Collection lens 604 is oriented at a third direction relative to the flow cell, and image capture train 608 is oriented at a fourth direction relative to the flow cell. As shown, laser illumination train 606 can include one or more lasers, one or more laser fibers, and one or more beam shapers.

Aspect 11. The cytometer of Aspect 10, wherein the fluorescence train comprises:
- a fluorescence collection block for receiving fluorescence from the target area; and
- one or more fluorescence collection pinholes that collect fluorescence from the target area and direct the fluorescence to the fluorescence collection block, the fluorescence being directed to the one or more fluorescence collection pinholes by the collection lens.

Aspect 12. The cytometer of any one of Aspects 10 to 11, wherein the backlighting system comprises a prism that directs the pulses of light from the optic fiber to the target area.

Aspect 13. The cytometer of any one of Aspects 10 to 12, wherein a portion of the optic fiber is bent. As described elsewhere herein, the optic fiber can be wound about a spindle; the fiber can also include one or more bends or undulations.

Aspect 14. The cytometer of any one of Aspects 10 to 12, wherein the image capture system comprises: [i] an image capture device that captures an image of the target area; and [ii] an objective lens that is focused on the target area and directs light from the target area to the image capture device.

Aspect 15. The cytometer of any one of Aspects 10 to 14, wherein the image capture system comprises a mirror positioned between the objective lens and a focal plane that directs the light from the objective lens onto the focal plane.

Aspect 16. The cytometer of Aspect 14, wherein the image capture device is a camera.

Aspect 17. The cytometer of Aspect 10, wherein the collection lens has a numerical aperture of from about 0.4 to about 1.2, e.g., for a condenser lens.

Aspect 18. A method, comprising: directing to a target area, from a first direction, a first laser illumination; directing to a target area, with a lens oriented at a second direction, a second laser illumination; collecting from the target area, from a third direction, an image of a target located at the target area; and collecting from the target area, from a fourth direction, fluorescence related to the second laser illumination with the lens and directing fluorescence from the target area to a fluorescence collection train.

Aspect 19. The method of Aspect 18, wherein the first laser illumination comprises illumination from a laser.

Aspect 20. The method of any one of Aspects 18 to 19, wherein the second laser illumination is communicated by a coiled optic fiber.

Aspect 21. The method of any one of Aspects 18 to 20, further comprising moving the lens while directing the second laser illumination to the target area.

Aspect 22. The method of any one of Aspects 18 to 21, further comprising communicating a plurality of particles through the target area.

Aspect 23. The method of Aspect 18, wherein the lens has a numerical aperture of from about 0.2 to about 1.2, e.g., for a condenser lens.

Aspect 24. An illumination module, comprising:
a sample region configured to contain a sample;
a first illumination source being configured to deliver illumination used in imaging;
a second illumination source being configured to deliver illumination used in fluorescence; and
an illumination director,
the illumination director comprising at least two illumination collectors,
a first illumination collector of the at least two illumination collectors configured to collect an image produced by illumination directed from the first illumination source to the sample, and
a second illumination collector of the at least two illumination collectors configured to collect fluorescence evolved from illumination from a second illumination source directed to the sample.

As described elsewhere herein, an illumination module can be configured such that the same lens (1) communicates the illumination (for imaging) provided by the first illumination source and (2) collects fluorescence evolved from illumination from the second illumination source directed to the sample.

An illumination collector (sometimes termed a "pinhole") can be, e.g., an aperture, a fiber, or other modality. As described elsewhere herein, a sample region can be, e.g., a flow cell. An illumination director can be a substrate (e.g., a plate, disc, or other shape) that has formed therein one or more apertures, which apertures can act as illumination collectors. (An exemplary, non-limiting arrangement is provided in FIG. 7.) An illumination director can also include one or more fibers, which fibers act as illumination collectors.

An illumination director can comprise one, two, or more segments, e.g., a first segment that has formed therein the first aperture, and a second segment that has formed therein the second aperture. Also as described elsewhere herein, a sample region can be the region addressed by a lens, e.g., as shown by field 702 in FIG. 7, which is the area addressed by collection lens 728.

Illumination sources can be, e.g., laser diodes, sources of visible light, and the like. A laser diode can be single-mode or multimode, and a fiber that communicates illumination can itself be single-mode or multimode. Illumination directed to the sample can itself be single-mode or multimode.

Aspect 25. The illumination module of Aspect 24, further comprising a third illumination source, the third illumination source being configured to deliver illumination used in fluorescence, and wherein the illuminator director comprises a third illumination collector, the third illumination collector being further from the first illumination collector than the second illumination collector is from the first illumination collector.

Aspect 26. The illumination module of Aspect 24, wherein the minimum distance between a point on the second illumination collector that is nearest to a point on the third illumination collector is from about 0 µm to about 5000 µm. By reference to FIG. 7, such a distance is the shortest distance between pinholes (i.e., apertures) 714 and 716. Fluorescence fibers and/or apertures can be equally spaced, although this is not a requirement.

Aspect 27. The illumination module of Aspect 24, wherein the minimum distance between a point on the first illumination collector that is nearest to a point on the second illumination collector is from about 0 µm to about 5000 µm.

As mentioned elsewhere herein, an exemplary, non-limiting arrangement is provided in FIG. 7. As shown in that figure, a particle (722) that transits the flow cell (not labeled) passes by several apertures (720, 718, 716, and 714), at each of which apertures the particle is illuminated by laser illumination, and evolved fluorescence (from each laser illumination) is collected by a fluorescence block or train. Following its transit past the laser illumination, the particle is illuminated by an illumination for imaging, and an image of the illuminated particle is collected. It should of course be understood that FIG. 7 is not limiting, and that one or more of the pinholes/apertures can be substituted with fibers. As described elsewhere herein, a "pinhole" can refer to an aperture or a fiber.

It should be understood that the timing of image collection can be adjusted. As shown in FIGS. 8 and 9, depending on the position of the particle relative to the imaging illumination, a user can obtain a different view of the particle. As FIG. 8 explains, in the plane of the particle the illumination can vary as a function of position within the illumination field. Different types of illumination including variations of oblique illumination can be obtained due to changes in angular spectrum as a function of position. Locations A, B, and C correspond to different illumination zones that are obtainable with different time delays (which in turn give rise to different angles of illumination), and FIG. 9 displays exemplary images collected in such zones. Accordingly, a user can collect imaging information at one, two, or more different times (and/or positions) after a particle has transited the laser-fluorescence illumination collectors (e.g., apertures and/or fibers). As one example, if a user determines that imaging information taken of a particle after an elapsed time ti following the particle's passage through the last of any fluorescence illumination collectors does not provide the desired visual information, the user can adjust that elapsed time (e.g., by changing the location at which the image is collected; by changing a velocity of the particle) to a value greater or lesser than ti such that subsequent particles are illuminated and then imaged in a way (and at a location) that provides the desired visual information.

Aspect 28. A method, comprising:
illuminating a sample when located at a first fluorescence location with a first fluorescence illumination that is directed to the sample and collecting a related first fluorescence;
illuminating the sample when located at a first imaging location with a first imaging illumination that is directed to the sample and collecting a related image, and
(a) the first fluorescence location and the first imaging location being separated by from about 0 µm to about 5000 µm,
(b) the sample transiting between the first fluorescence location and the first imaging location in from about 0 µs to about 1000 µs, or
(c) both (a) and (b).

Aspect 29. The method of Aspect 28, wherein the sample transits between the first fluorescence location and the first imaging location in from about 0 µs to about 1000 µs.

Aspect 30. The method of any one of Aspects 28 to 29, wherein the related first fluorescence and the first imaging illumination are communicated through the same lens.

Aspect 31. The method of any one of Aspects 28-30, further comprising illuminating the sample when located at a second fluorescence location with a second fluorescence illumination that is directed to the sample and collecting a related second fluorescence.

One can adjust the imaging location so as to give rise to an image having the desired information. For example, if one determines that imaging a particle at the first imaging location does not provide sufficient contrast to visualize certain features of the particle, one can adjust the location at which the particle is imaged. As an example, if a particle is imaged X seconds after it exits the first fluorescence location and the image does not yield the desired contrast, one can image the particle at, e.g., 0.9X or 1.1X seconds following the particle's exit from the fluorescence location. Such an approach is shown in FIGS. 8 and 9, which figures show the difference in image contrast that can be achieved by imaging a particle under differing lighting conditions.

Aspect 32. An imaging system, comprising: a sample region configured to receive a sample; a laser illumination train configured to provide a laser illumination to the sample region so to effect fluorescence of a sample in the sample region; an optical illumination train configured to provide imaging illumination to illuminate a sample in the sample region for imaging; a fluorescence train configured to receive illumination directed from the sample region; a sample region lens in optical communication with the sample region, the sample region lens being configured to direct an illumination collected from the sample region to the fluorescence train, the sample region lens being configured to direct an illumination from the optical illumination train to the sample region; optionally, a forward scatter detector configured to collect scattered light from the sample region; and an image capture train configured to collect an image of a sample in the sample region illuminated by the imaging illumination.

Aspect 33. The imaging system of Aspect 32, wherein the laser illumination train comprises a plurality of lasers operating at different wavelengths.

Aspect 34. The imaging system of Aspect 33, wherein the system is configured such that a laser of plurality of lasers provides illumination to a location within the sample region that is associated with that laser, and optionally wherein the system is configured so as to provide illumination from one or more of the lasers based, at least in part, on one or more time intervals indicative of the sample's motion through the sample region. Thus (and without being bound to any particular or embodiment), a system according to the present disclosure can effect illumination of a location (e.g., a location where a sample is expected to be or known to be based on a time interval or delay, which interval or delay can be related to the sample's velocity within the system. As an example, if a sample particle is interrogated at a first location, the system can be configured to supply illumination to a second location where the sample particle is expected to be following a certain time interval and, in some embodiments, the system can image and/or further interrogate the sample particle when the particle reaches the second location. In some embodiments, the imaging and/or interrogation of the sample particle at the second location can be dependent on the sample particle meeting one or more criteria (e.g., size, fluorescence signal, scattering signal) that are determined at the particle's first location. In this way, a system can be configured to image and/or interrogate only those sample particles that meet particular gating criteria. In this way, a system can operate with reduced memory/storage demands, as the system can be configured to collect imaging and/or fluorescence information from only those sample particles that meet certain criteria, thereby conserving memory resources for use in saving information related to only those particles of interest. It should be understood, of course, that a system can apply one gating criterion or a plurality of gating criteria. It should also be understood that a system according to the present disclosure can operate in a staged manner, e.g., in which (1) the system interrogates a particle at a first location to determine if the particle meets certain gating criteria; (2) the system images and/or collects fluorescence information of a particle meeting the gating criteria when that particle reaches a second location; (3) the system interrogates the particle at a third location to determine if the particle meets certain further gating criteria; (4) the system images and/or collects fluorescence information of the particle meeting the further gating criteria when that particle reaches a fourth location.

Aspect 35. The imaging system of Aspect 34, wherein the fluorescence train, wherein the fluorescence train comprises a plurality of fluorescence collection pinholes, each of the fluorescence collection pinholes being associated with a different one of the plurality of lasers.

Aspect 36. The imaging system of any one of Aspects 32-35, wherein the illumination received by the fluorescence train in connection with a given sample defines a fluorescence profile of the sample, and wherein the image capture train is operated in response to the fluorescence profile of the sample.

Aspect 37. The imaging system of Aspect 36, wherein the system is configured to collect, with the image capture train, at least one image of a sample having a fluorescence profile meeting one or more predetermined fluorescence criteria. Thus (and without being bound to any particular or embodiment), a system according to the present disclosure can effect imaging of a sample that meets one or more particular fluorescence gating criteria.

Aspect 37. The imaging system of any one of Aspects 32-36, wherein the system is configured to collect, with the image capture train, an image of a sample based, at least in part, on one or more time intervals indicative of the sample's motion through the sample region, and optionally wherein the system is configured to provide imaging illumination to illuminate the sample based, at least in part, on one or more time intervals indicative of the sample's motion within the sample region. Without being bound to any particular theory or embodiment, a system according to the present disclosure can apply imaging illumination when a sample particle reaches the desired imaging location within the flow cell.

Aspect 38. The imaging system of any one of Aspects 32-37, wherein the system is configured such that (1) a first location within the sample region receives illumination from the optical illumination train having a first set of optical properties and (2) a second location within the sample region receives illumination from the optical illumination train having a second set of optical properties. In this way, depending on where particle is within sample region, the particle will experience light having different optical characteristics, e.g., light having different angles of incidence.

Aspect 39. The imaging system of any one of Aspects 32-38, wherein the system is configured to generate a fluorescence profile of the sample from illumination received by the fluorescence train and operate the image capture train in response to the fluorescence profile. In this way, a system can operate so as to collect images of only those sample particles that meet fluorescence gating criteria.

Aspect 40. The imaging system of any one of Aspects 32-39, wherein the laser illumination is generally along a first orientation relative to the sample region.

Aspect 41. The imaging system of any one of Aspects 32-40, wherein the sample region lens directs, generally along a second orientation relative to the sample region, illumination collected from the sample region to the fluorescence train.

Aspect 42. The imaging system of Aspect 41, wherein the sample region lens directs, generally along the second orientation relative to the sample region, illumination from the optical illumination train to the fluorescence train.

Aspect 43. The imaging system of any one of Aspects 32-42, wherein the image capture train collects, generally along a third orientation relative to the sample region, the image of the sample in the sample region.

Aspect 44. The imaging system of any one of Aspects 32-43, wherein the imaging system comprises a forward scatter detector configured to collect scattered light from the sample region, the scatter detector configured to collect, generally along a fourth orientation relative to the sample region, scattered light from the sample region.

Aspect 45. The imaging system of any one of Aspects 32-44, wherein the optical illumination train provides illumination characterized as being donut-shaped in configuration.

Aspect 46. A method, comprising: with a sample communicated within a sample region; exciting the sample with excitation illumination from a plurality of lasers operating at different wavelengths so as to generate a fluorescence profile of the sample; illuminating the sample with imaging illumination from an optical illumination train configured to provide imaging illumination to illuminate the sample for imaging; with a sample region lens, (1) directing, to a fluorescence train, illumination emitted from the sample in response to the excitation illumination, and (2) directing, to the sample region, imaging illumination from the illumination train; and collecting, with an image capture train, an image of the sample when the fluorescence profile of the sample meets one or more predetermined fluorescence criteria.

Aspect 47. The method of Aspect 46, wherein collecting the image is based, at least in part, on one or more time intervals indicative of the sample's motion through the sample region.

Aspect 48. The method of any one of Aspects 46-47, wherein (1) a first location within the sample region receives imaging illumination from the optical illumination train having a first set of optical properties and (2) a second location within the sample region receives imaging illumination from the optical illumination train having a second set of optical properties.

Aspect 49. The method of Aspect 48, wherein the optical properties of the imaging illumination received by the sample vary depending on the sample's location within the sample region.

Aspect 50. The method of any one of Aspects 46-49, further comprising collecting, with a forward scattering detector, light scattered by the sample.

Aspect 51. The method of any one of Aspects 46-50, wherein the excitation illumination is directed to the sample region generally along a first orientation relative to the sample region.

Aspect 52. The method of Aspect 51, wherein the sample region lens directs the excitation illumination to the fluorescence train generally along a second orientation relative to the sample region.

Aspect 53. The method of Aspect 52, wherein the sample region lens directs the imaging illumination to the sample region generally along the second orientation relative to the sample region.

Aspect 54. The method of Aspect 53, wherein the image capture train collects, generally along a third orientation relative to the sample region, the image of the sample in the sample region.

Aspect 55. The method of any one of Aspects 46-54, further comprising collecting, with a forward scatter detector, scattered light from the sample region.

Aspect 56. The method of Aspect 55, wherein the forward scatter detector collects the scatted light generally along a fourth orientation relative to the sample region.

Aspect 57. The method of any one of Aspects 46-56, wherein the imaging illumination is characterized as being donut-shaped in configuration.

What is claimed:
1. A method, comprising:
    exciting a sample communicated within a sample region with excitation illumination from an excitation illumination train so as to generate a fluorescence profile of the sample,
    illuminating the sample with imaging illumination from an optical illumination train configured to provide imaging illumination;
    (i) directing illumination emitted from the sample in response to the excitation illumination to a fluorescence train and (ii) directing illumination from the optical illumination train to the sample region where the sample is located; and
    collecting an image of the sample with an imager.
2. The method of claim 1, wherein collecting the image is based, at least in part, on one or more time intervals indicative of the sample's motion through the sample region.
3. The method of claim 1, wherein (1) a first location within the sample region receives imaging illumination from the optical illumination train having a first set of optical properties and (2) a second location within the sample region receives imaging illumination from the optical illumination train having a second set of optical properties.
4. The method of claim 1, wherein optical properties of the imaging illumination received by the sample vary depending on the sample's location within the sample region.

5. The method of claim 1, further comprising collecting, with a forward scattering detector, light scattered by the sample.

6. The method of claim 1, wherein the excitation illumination is directed to the sample region generally along a first orientation relative to the sample region.

7. The method of claim 6, wherein a sample region lens directs the excitation illumination to the fluorescence train generally along a second orientation relative to the sample region.

8. The method of claim 7, wherein the sample region lens directs the imaging illumination to the sample region generally along the second orientation relative to the sample region.

9. The method of claim 8, wherein an image capture train collects, generally along a third orientation relative to the sample region, the image of the sample in the sample region.

10. The method of claim 1, further comprising collecting, with a forward scatter detector, scattered light from the sample region.

11. The method of claim 10, wherein the forward scatter detector collects the scattered light generally along a fourth orientation relative to the sample region.

12. The method of claim 1, wherein the imaging illumination is characterized as being donut-shaped in configuration.

13. The method of claim 1, wherein the fluorescence train collects side scatter from the sample region.

14. The method of claim 1, wherein a sample region lens defines a field of view, and wherein the field of view is illuminated by at least one laser of the excitation illumination train and by the optical illumination train.

15. An imaging system, comprising:
a sample region configured to receive a sample;
a laser illumination train configured to provide laser illumination of a plurality of wavelengths to the sample region to give rise to fluorescence of a sample in the sample region;
an optical illumination train configured to provide imaging illumination to illuminate a sample in the sample region for imaging;
a fluorescence train configured to collect fluorescence evolved in the sample region;
a sample region lens in optical communication with the sample region,
the sample region lens being configured (i) to direct illumination collected from the sample region to the fluorescence train and (ii) to direct illumination from the optical illumination train to the sample region;
an image capture train comprising an imager configured to collect an image of a sample in the sample region illuminated by the imaging illumination.

16. The imaging system of claim 15, wherein the imaging capture train is configured to collect an image of the sample when a fluorescence profile of the sample meets one or more predetermined fluorescence criteria.

17. The imaging system of claim 15, wherein the laser illumination train comprises a plurality of lasers.

18. The imaging system of claim 15, further comprising a forward scatter detector configured to collect scattered light from the sample region.

19. The imaging system of claim 15, wherein the image capture train comprises an objective lens in optical communication with the sample region.

20. The imaging system of claim 15, wherein the image capture train comprises at least one mirror configured to direct illumination from the sample region toward the imager.

* * * * *